(12) United States Patent
Kim et al.

(10) Patent No.: US 8,761,047 B2
(45) Date of Patent: Jun. 24, 2014

(54) RANDOM ACCESS METHOD AND APPARATUS OF UE IN MOBILE COMMUNICATION SYSTEM

(75) Inventors: Soeng Hun Kim, Yongin-si (KR); Boon Loong Ng, Richardson, TX (US); Gert-Jan Van Lieshout, Staines (GB); Kyeong In Jeong, Suwon-si (KR); Joon Young Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 182 days.

(21) Appl. No.: 13/348,003

(22) Filed: Jan. 11, 2012

(65) Prior Publication Data

US 2012/0176967 A1    Jul. 12, 2012

Related U.S. Application Data

(60) Provisional application No. 61/431,635, filed on Jan. 11, 2011.

(30) Foreign Application Priority Data

Sep. 27, 2011 (KR) .......................... 10-2011-0097409
Jan. 6, 2012 (KR) .......................... 10-2012-0001774

(51) Int. Cl.
*H04W 80/04* (2009.01)
*H04W 88/06* (2009.01)

(52) U.S. Cl.
USPC ............................ 370/254; 370/252; 370/328

(58) Field of Classification Search
CPC ......... H04L 41/12; H04L 45/02; H04L 47/10; H04L 43/50; H04W 80/04; H04W 88/06
USPC .......................................... 370/252, 254, 328
See application file for complete search history.

(56) References Cited

U.S. PATENT DOCUMENTS

| 8,223,708 | B2 | 7/2012 | Guo | |
| 2010/0002664 | A1* | 1/2010 | Pan et al. | 370/338 |
| 2010/0008236 | A1 | 1/2010 | Zhang et al. | |
| 2010/0080184 | A1 | 4/2010 | Tseng | |
| 2010/0098011 | A1* | 4/2010 | Pelletier et al. | 370/329 |
| 2011/0134774 | A1* | 6/2011 | Pelletier et al. | 370/252 |

FOREIGN PATENT DOCUMENTS

| KR | 10-2009-0128344 A | 12/2009 |
| KR | 10-2010-0094534 A | 8/2010 |

* cited by examiner

*Primary Examiner* — Ronald Abelson
(74) *Attorney, Agent, or Firm* — Jefferson IP Law, LLP

(57) ABSTRACT

A method and an apparatus for performing random access and uplink transmission of a User Equipment (UE) supporting Carrier Aggregation (CA) are provided. The method includes determining whether a Scheduling Request (SR) is pending, determining, when the SR is pending, whether an uplink transmission resource is available in a current Transmission Time Interval (TTI), determining, when the uplink transmission resource is not available, whether a Physical Uplink Control Channel (PUCCH) resource is configured for transmission of the SR, and initiating, when the PUCCH resource is not configured, a random access process in a primary cell. The random access method and apparatus of the present invention is advantageous to reduce the waste of transmission resources.

12 Claims, 8 Drawing Sheets

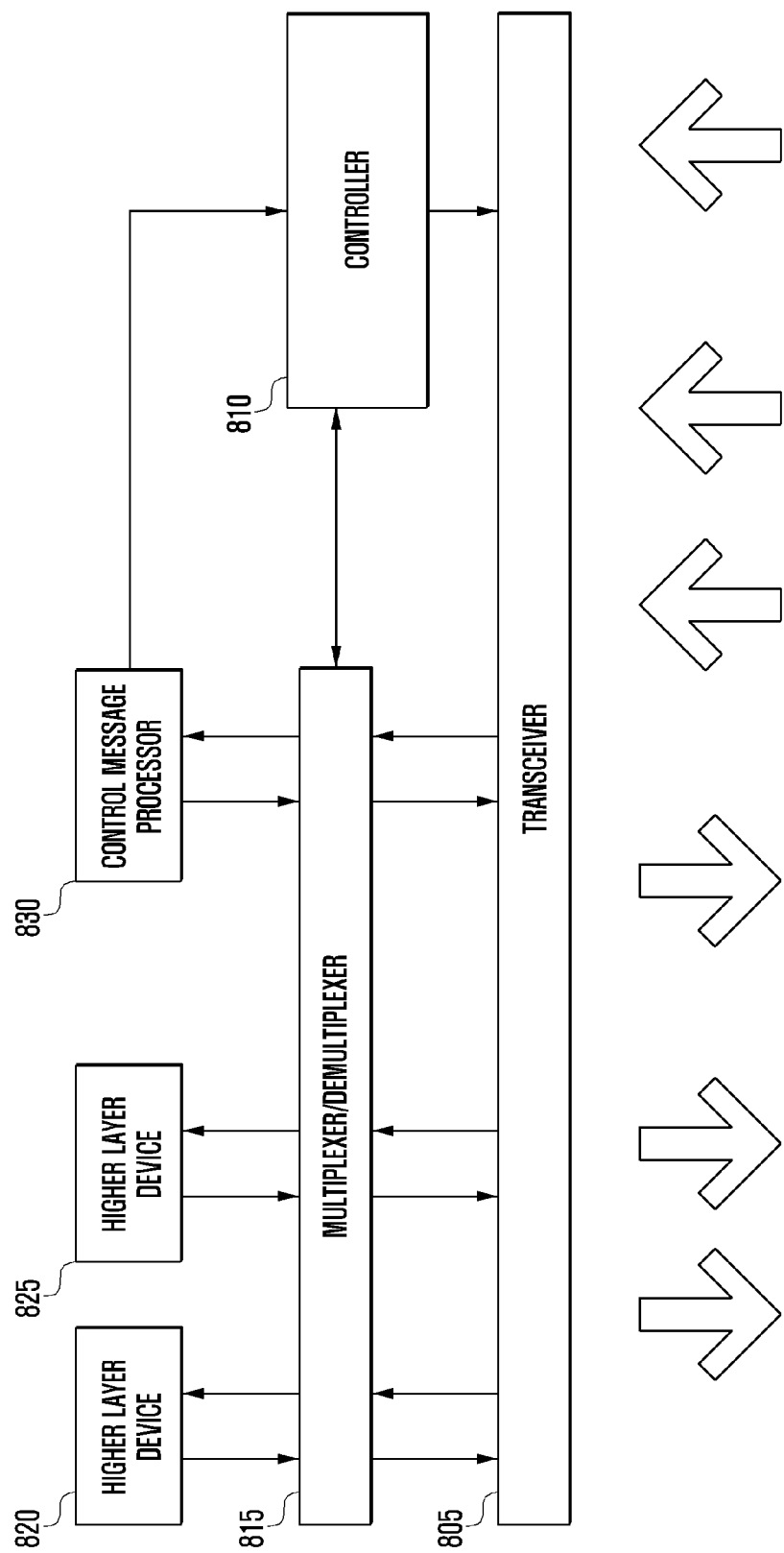

RANDOM ACCESS METHOD AND APPARATUS OF UE IN MOBILE COMMUNICATION SYSTEM

CROSS-REFERENCE TO RELATED APPLICATIONS

This application claims the benefit under 35 U.S.C. §119(e) of a U.S. provisional application filed on Jan. 11, 2011 in the U.S. Patent and Trademark Office and assigned Ser. No. 61/431,635, and under 35 U.S.C. §119(a) of a Korean patent application filed on Sep. 27, 2011 in the Korean Intellectual Property Office and assigned Serial No. 10-2011-0097409 and a Korean patent application filed on Jan. 6, 2012 in the Korean Intellectual Property Office and assigned Serial No. 10-2012-0001774, the entire disclosure of each of which is hereby incorporated by reference.

BACKGROUND OF THE INVENTION

1. Field of the Invention

The present invention relates to a method and apparatus for processing random access and uplink transmission of a User Equipment (UE) in a mobile communication system. More particularly, the present invention relates to a method and apparatus for performing random access and uplink transmission of the UE supporting Carrier Aggregation (CA) efficiently.

2. Description of the Related Art

Mobile communication systems have been developed to provide subscribers with voice communication services on the move. With the rapid advance of technologies, the mobile communication systems have evolved to support high speed data communication services as well as standard voice communication services.

Currently, the next generation mobile communication system of the 3rd Generation Partnership Project (3GPP), known as the Long Term Evolution (LTE) system, is under development. The LTE system is a technology for implementing high-speed packet-based communication at about 100 Mbps. Recently, an LTE-Advanced (LTE-A) system is actively discussed as an evolution of the LTE system carrier aggregation to meet broader bandwidth requirements. Carrier aggregation is a technology for a User Equipment (UE) to transmit/receive data over multiple carriers. In detail, the UE transmits/receives data in cells using aggregated carriers (cells under the control of the same evolved Node B (eNB)). This means that the UE transmits/receives data in multiple cells.

Typically, a UE attempts random access to set up initial connection to a certain communication network. In a certain mobile communication system such as the LTE system, a random access process is used for another purpose, e.g., buffer state report and uplink transmission timing synchronization acquisition, as well as an initial access. In a case when the UE in a connected state performs random access, the UE may encounter a situation where the uplink transmission is required simultaneously with another ongoing uplink transmission or another random access attempt. More particularly, when the UE is operating in carrier aggregation mode, such situation is likely to occur more frequently. Therefore, a need exists for a method of a UE to perform random access regardless of ongoing uplink transmission.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a random access method and terminal performing the random access that is capable of reducing transmission resource waste.

In accordance with an aspect of the present invention, a random access method of a terminal is provided. The method includes determining whether a Scheduling Request (SR) is pending, determining, when the SR is pending, whether an uplink transmission resource is available in a current Transmission Time Interval (TTI), determining, when the uplink transmission resource is not available, whether a Physical Uplink Control Channel (PUCCH) resource is configured for transmission of the SR, and initiating, when the PUCCH resource is not configured, a random access process in a primary cell.

In accordance with another aspect of the present invention, a terminal for performing random access is provided. The terminal includes a controller for determining whether an SR is pending, for determining, when the SR is pending, whether an uplink transmission resource is available in a current TTI, for determining, when the uplink transmission resource is not available, whether a PUCCH resource is configured for transmission of the SR, and for initiating, when the PUCCH resource is not configured, a random access process in a primary cell.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIG. 8 is a block diagram illustrating a configuration of a UE according to an exemplary embodiment of the present invention.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention provide a method and apparatus for reporting User Equipment (UE) capability to a network. A brief description is made of a Long Term Evolution (LTE) system and a carrier aggregation technique.

Figure 1:
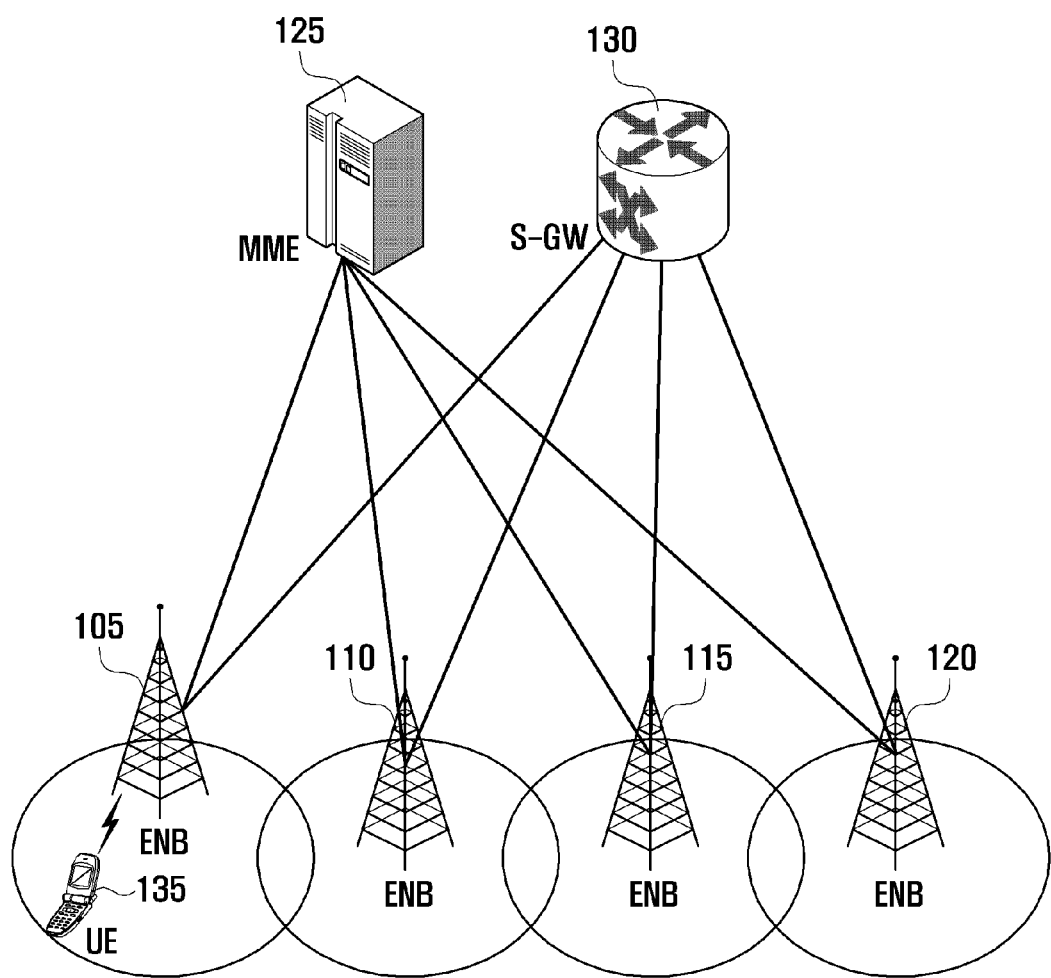
FIG. 1 is a diagram illustrating a Long Term Evolution (LTE) system according to an exemplary embodiment of the present invention.

FIG. 1 is a diagram illustrating an LTE system according to an exemplary embodiment of the present invention.

Referring to FIG. 1, the radio access network of the mobile communication system includes evolved Node Bs (eNBs) 105, 110, 115, and 120, a Mobility Management Entity (MME) 125, and a Serving-Gateway (S-GW) 130. A UE 135 connects to an external network via the eNBs 105, 110, 115, and 120 and the S-GW 130.

In FIG. 1, the eNBs 105, 110, 115, and 120 correspond to legacy node Bs of a Universal Mobile Telecommunications System (UMTS). The eNBs 105, 110, 115, and 120 allow the UE to establish a radio link and are responsible for complicated functions as compared to the legacy node B. In the LTE system, all the user traffic including real time services such as Voice over Internet Protocol (VoIP) are provided through a shared channel. Thus, there is a need for a device which is located in the eNB to schedule data based on state information such as UE buffer conditions, a power headroom state, and a channel state. Typically, one eNB controls a plurality of cells. In order to secure a data rate of up to 100 Mbps, the LTE system adopts Orthogonal Frequency Division Multiplexing (OFDM) as a radio access technology. Also, the LTE system adopts Adaptive Modulation and Coding (AMC) to determine the modulation scheme and channel coding rate in adaptation to the channel condition of the UE. The S-GW 130 is an entity that provides data bearers to establish and release data bearers under the control of the MME 125. The MME 125 is responsible for various control functions and is connected to a plurality of eNBs 105, 110, 115, and 120.

Figure 2:
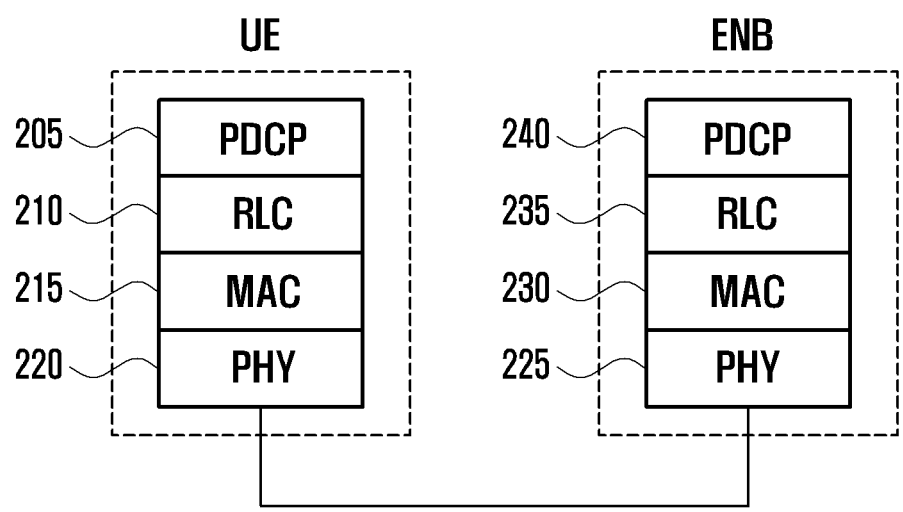
FIG. 2 is a diagram illustrating a protocol stack of an LTE system according to an exemplary embodiment of the present invention.

FIG. 2 is a diagram illustrating a protocol stack of an LTE system according to an exemplary embodiment of the present invention.

Referring to FIG. 2, the protocol stack of the LTE system includes Packet Data Convergence Protocol (PDCP) layers 205 and 240, Radio Link Control (RLC) layers 210 and 235, Medium Access Control (MAC) layers 215 and 230, and Physical (PHY) layers 220 and 225. The PDCP layers 205 and 240 are responsible for IP header compression/decompression. The RLC layers 210 and 235 are responsible for segmenting the PDCP Protocol Data Unit (PDU) into segments in an appropriate size for an Automatic Repeat Request (ARQ) operation. The MAC layers 215 and 230 are responsible for establishing connection to a plurality of RLC entities to multiplex the RLC PDUs into MAC PDUs and demultiplex the MAC PDUs into RLC PDUs. The PHY layers 220 and 225 perform channel coding on the MAC PDU and modulate the MAC PDU into OFDM symbols to transmit over a radio channel or perform demodulating and channel-decoding on the received OFDM symbols and deliver the decoded data to the higher layer.

Figure 3:
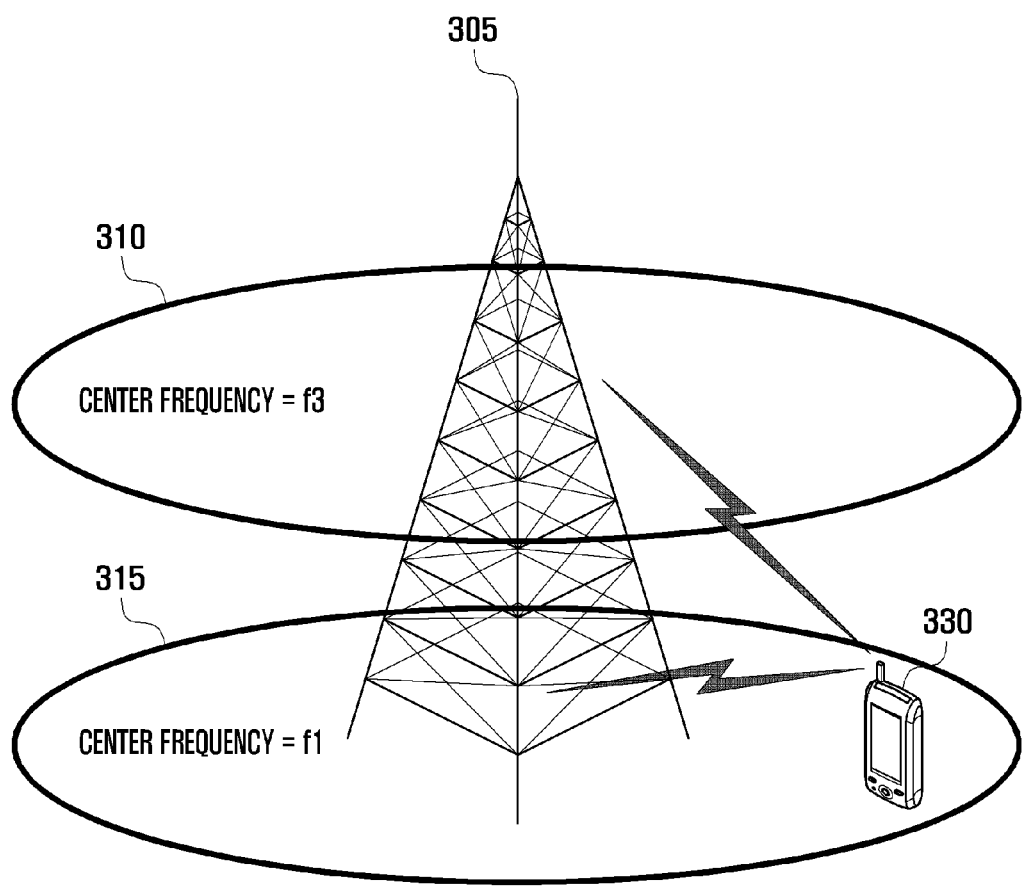
FIG. 3 is a diagram illustrating a carrier aggregation in an LTE system according to an exemplary embodiment of the present invention.

FIG. 3 is a diagram illustrating carrier aggregation in an LTE system according to an exemplary embodiment of the present invention.

Referring to FIG. 3, an eNB can use multiple carriers transmitted and receive in different frequency bands. For example, the eNB 305 can be configured to use a carrier 315 with center frequency f1 and a carrier 310 with center frequency f3. If carrier aggregation is not supported, a UE 330 has to transmit/receive data using one of the carriers 310 and 315. However, the UE 330 having the carrier aggregation capability can transmit/receive data using both the carriers 310 and 315. The eNB can increase the amount of the resource to be allocated to the UE having the carrier aggregation capability in adaptation to the channel condition of the UE to improve the data rate of the UE.

In a case where a cell is configured with one downlink carrier and one uplink carrier, carrier aggregation can be understood as if the UE communicates data via multiple cells. With the use of carrier aggregation, the maximum data rate increases in proportion to the number of aggregated carriers.

In the following description, the phrase "the UE receives data through a certain downlink carrier or transmits data through a certain uplink carrier" means to transmit or receive data through control and data channels provided in a cell corresponding to center frequencies and frequency bands of the downlink and uplink carriers. Although the description is directed to an LTE mobile communication system for convenience, the present invention can be applied to other types of wireless communication systems supporting carrier aggregation.

If a UE is configured with multiple serving cells (i.e., the UE operates in carrier aggregation mode) and if the newly added serving cells have uplink channels (for reference, a newly added serving cell can have downlink channel or downlink and uplink channels), the UE can perform a random access process to the newly added serving cell. For example, the serving cells configured for a UE are categorized into primary and secondary cells. The serving cell to which the UE has established connection before other serving cells are configured is referred to as the primary cell. That is, the cell to which the UE has established Radio Resource Control (RRC) connection setup or the cell to which the UE has performed handover after the RRC connection setup becomes the primary cell. Meanwhile, the cell configured for carrier aggregation is referred to as the secondary cell.

Although it is typical for the UE to perform random access to the primary cell, the UE also can perform random access to the secondary cell. For example, when the uplink transmission timing of the secondary cell differs from the primary cell, the eNB can command the UE to perform random access to the secondary cell.

In more detail, the serving cells of the UE can be grouped into at least one Timing Advance Group (TAG). The TAG is a set of serving cells sharing the same uplink transmission timing. If the serving cells belonged to the TAG share the same uplink transmission timing, this means that the uplink transmission timings of the serving cells are identical among each other, and acquired and lost all together. Also, the uplink transmission timings of the serving cells belonged to the same TAG are adjusted simultaneously. The TAGs are categorized into primary and secondary TAGs. The primary TAG consists of the primary cells, and the secondary TAG consists of the secondary cells. The random access is allowed for the primary cell in the primary TAG and the secondary cell in the secondary TAG.

Figure 4:
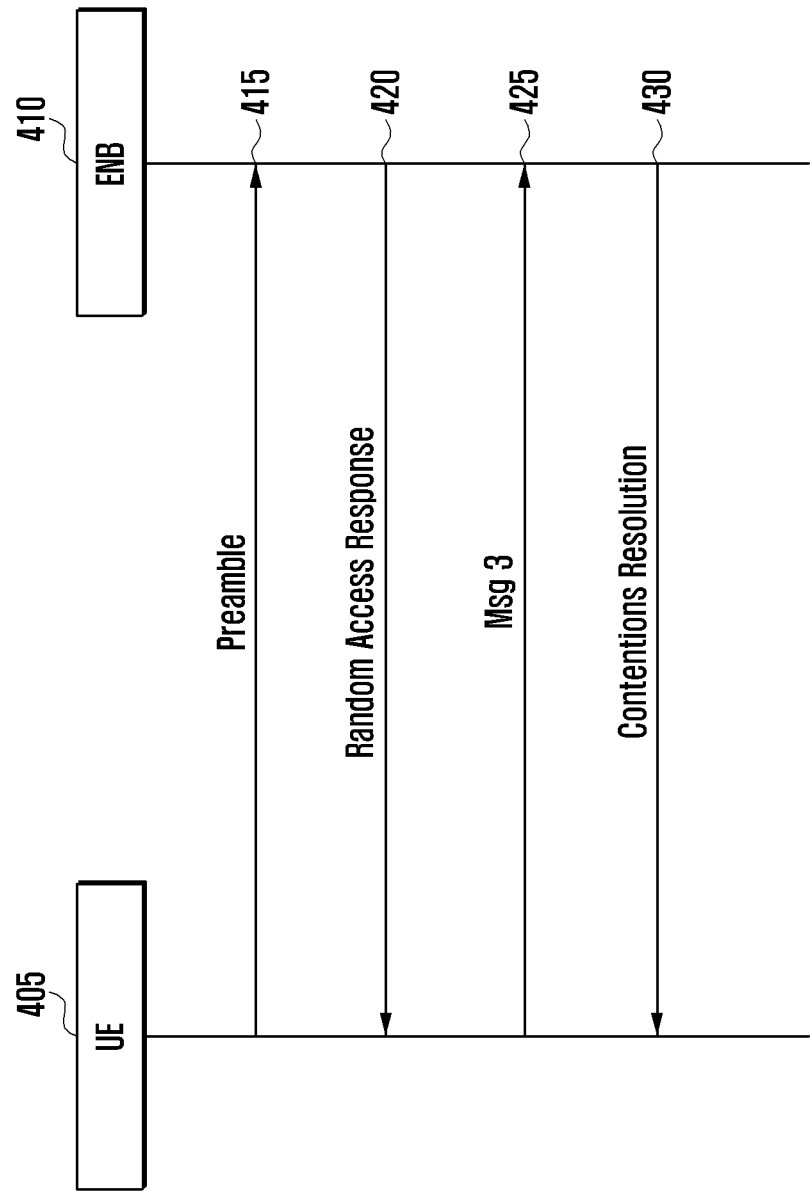
FIG. 4 is a signaling diagram illustrating signal flows between a User Equipment (UE) and an evolved Node B (eNB) in a random access method according to an exemplary embodiment of the present invention.

The random access process includes four steps of preamble transmission, a random access response reception, a message 3 transmission, and contentions resolution, as depicted in FIG. 4. In a certain case, the last two steps may be omitted.

FIG. 4 is a signaling diagram illustrating signal flows between a UE and an eNB in a random access method according to an exemplary embodiment of the present invention.

If it is required to perform random access due to a certain reason, the UE 405 determines timing and a resource and type of preamble for transmission by verifying a random access channel configuration and a preamble resource of the cell to which the random access is attempted. The UE 405 transmits a preamble at a preamble transmission power determined based on the current channel state, e.g., path-loss at step 415.

Upon receipt of the preamble transmitted by the UE 405, the eNB 410 transmits a Random Access Response message to the UE 405 in response to the preamble at step 420. The Random Access Response message includes an uplink transmission timing adjustment command and information on the uplink transmission resource for the message 3 transmission.

Upon receipt of the Random Access Response message, the UE 405 transmits the message 3 to the eNB 410 at step 425. The message 3 includes UE identity information, and the eNB 410 transmits a reply in response to the message 3 at step 430 (this process is referred to as Contentions Resolution). If the eNB 410 does not receive the preamble, the UE 405 does not receive the response. In this case, the UE 405 retransmits the preamble in a preset time at a transmission power increased as much as a preset level through a certain kind of uplink power control.

As described above, the UE may encounter a situation where uplink transmission is required at a certain time in the random access process. In this case, the UE determines the uplink transmission to be performed or to which transmission power is allocated based on the following description.

Preamble transmission is performed in a primary cell or a secondary cell (or preamble transmission is in a primary TAG or a secondary TAG).

The type of uplink transmission (other than the preamble transmission). For example, retransmission, that is possible or if transmission is of user data or control data.

Figure 5:
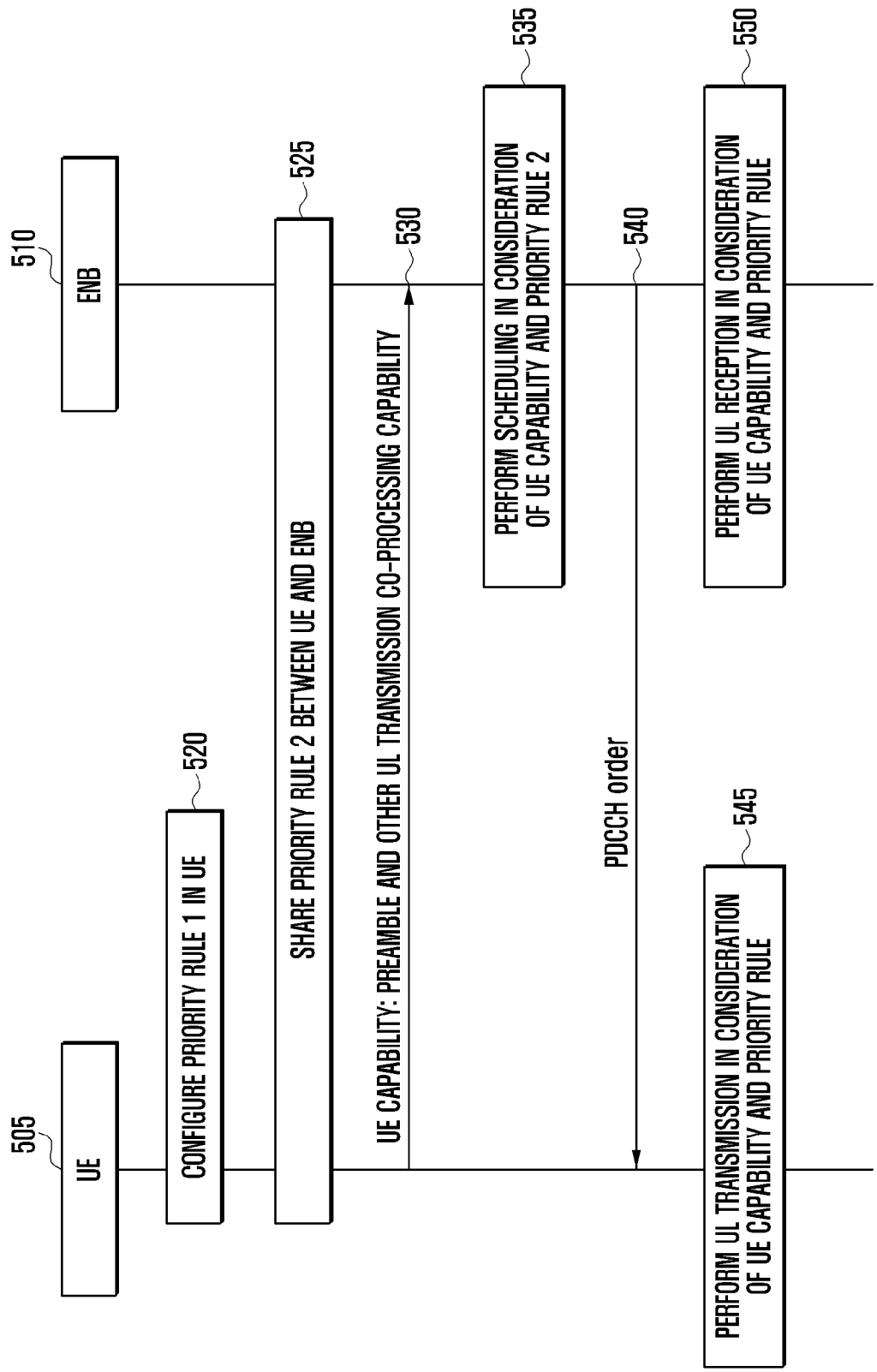
FIG. 5 is a signaling diagram illustrating a random access method according to an exemplary embodiment of the present invention.

FIG. 5 is a signaling diagram illustrating a random access method according to an exemplary embodiment of the present invention.

A UE 505 has two priority rules. The first priority rule (i.e., priority rule 1) is the rule for determining priority between preamble transmission and another uplink transmission in a primary cell, and the second priority rule (i.e., priority rule 2) is the rule for determining priority between a preamble transmission and another uplink transmission in a secondary cell.

The probability of concurrence between the preamble transmission and the other uplink transmission in the primary cell is not high based on the following description.

It is typical for the UE 505 in carrier aggregation mode to be allocated a Physical Uplink Control Channel (PUCCH) transmission resource for a Scheduling Request (SR). Accordingly, there is little chance for the UE 505 to transmit a Buffer Status Request (BSR) with a random access.

By taking notice of the fact that the main reason why the UE in a connected state performs random access to the primary cell is to transmit the BSR without the PUCCH transmission resource allocated for the SR, i.e., the UE 505 has little chance to perform random access to the primary cell, the probability of concurrence between the preamble transmission and the other uplink transmission at the same timing is also very low.

Accordingly, although the priority rule 1 is an internal rule of the UE 505 that is not shared with an eNB 510, the probability for the rule to cause a problem is not high such that the priority rule 1 is defined as the internal rule of the UE 505 to reduce the complexity of the eNB in an exemplary embodiment of the present invention at step 520.

The probability of the concurrence between the preamble transmission and the other uplink transmission in a secondary cell is relatively high by taking notice of the following.

If the UE 505 in a connected state performs random access to a secondary cell, it is required to acquire uplink transmission timing for uplink transmission in the secondary cell.

A synchronization acquisition process can be required whenever the corresponding secondary cell is activated. The uplink transmission is required in the secondary cell to increase an uplink data rate of the UE 505. Accordingly, the probability of a Physical Uplink Shared Channel (PUSCH) transmission in another serving cell at the timing for preamble transmission in the secondary cell is higher.

If the priority rule 2 is defined as an internal rule of the UE 505 without being shared by the eNB, the eNB is likely to perform a redundant operation such as double decoding that causes bad effects to the system performance of the eNB whenever the preamble and other uplink transmissions concur, because the eNB is not aware of the uplink transmission timing. In order to avoid this situation, the priority rule 2 is defined as the rule shared by the UE 505 and the eNB 510 in an exemplary embodiment of the present invention at step 525.

The priority rule 1 and priority rule 2 are described later in more detail.

After configuring the priority rules 1 and 2, the UE 505 transmits the eNB 510 a control message including UE capability at a certain time point in response to a UE capability request from the eNB 510 at step 530. The control information is transmitted to the eNB 510 in an RRC message referred to as UE CAPABILITY INFORMATION. The UE capability information includes the following:

Frequency band(s) supported by UE;
Combination(s) of frequency bands supported by UE;
Number of MIMO layers per frequency band;
Number of cells that can be aggregated per frequency band; and
Maximum bandwidth per frequency band.

In an exemplary embodiment of the present invention, the control information can further include information on whether the UE can perform a preamble transmission and another uplink transmission. The control information can be associated with other conventional capability information. For example, if the UE support simultaneous transmission of PUSCH/PUCCH or uplink carrier aggregation on two or more frequency bands, it is regarded that the preamble and the other uplink transmission can concur. Whether the simultaneous transmission of the preamble and other uplink transmissions are supported can be indicated with a newly introduced Information Element (IE).

The eNB configures functions, e.g. carrier aggregation, in consideration of the UE capability and traffic condition, and performs downlink and uplink data communication with the UE. The eNB performs uplink scheduling and receives data transmitted in uplink according to the UE capability and priority rule 2 at step 535. For example, if the preamble and other uplink transmissions concur for a UE which does not support simultaneous preamble and other uplink transmissions, the eNB determines the uplink signal to be received first according to the priority rule 2. In more detail, the eNB instructs the UE to perform random access through a downlink control channel at a certain point at step 540. For example, the eNB 510 can command the UE to perform random access for acquiring uplink synchronization of the TAG for which the uplink transmission timing synchronization is not acquired yet.

The UE 505 determines the priority rule to be applied based on whether the cell to which random access is attempted is the primary cell or the secondary cell and performs uplink transmission according to the determined priority rule at step 545. The eNB 510 performs uplink data reception based on whether the random access is attempted to the primary cell or the secondary cell at step 550. If the random access is attempted to the secondary cell, the eNB 510 performs the uplink data reception according to the priority rule 2. Otherwise, if the random access is attempted to the primary cell, the eNB 510 performs double decoding to receive the data transmitted by the UE without determination on the priority of the uplink data because the eNB 510 does not know how to determine reception priority.

Alternatively, the UE can operate to select the priority rule 1 for the case where only the primary TAG is configured and the priority rule 2 for the case where at least one secondary TAG is configured (i.e., there is at least one secondary cell of which uplink transmission timing is managed in separation of the primary cell.

Figure 6:
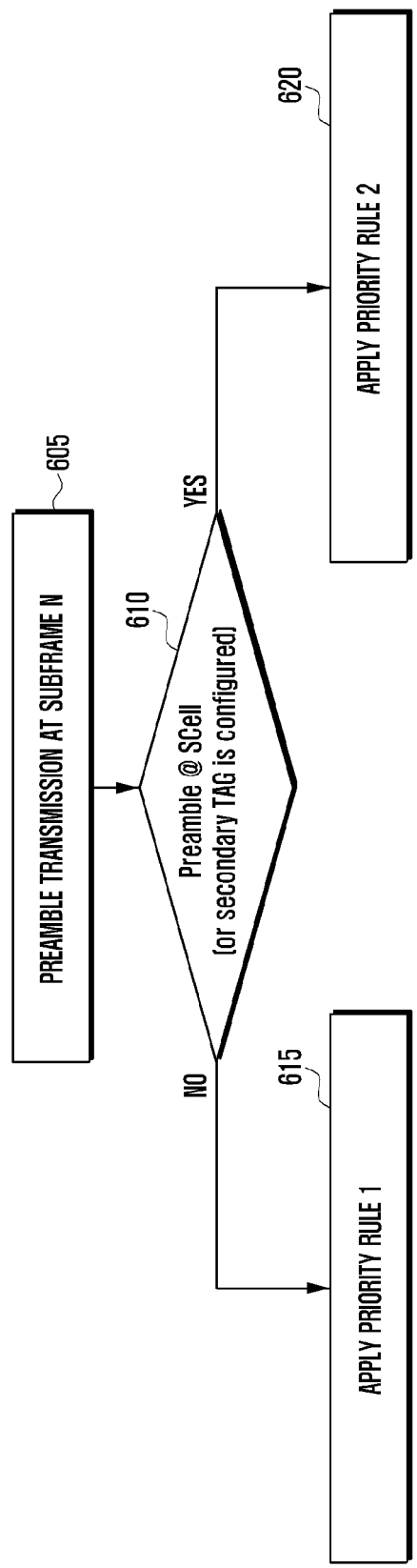
FIG. 6 is a flowchart illustrating a UE procedure for selecting a priority rule in a random access method according to an exemplary embodiment of the present invention.

FIG. 6 is a flowchart illustrating a UE procedure for selecting a priority rule in a random access method according to an exemplary embodiment of the present invention.

The UE determines to transmit a preamble in an $n^{th}$ subframe at step 605. If the random access process is triggered, the UE transmits the preamble in the next subframe available for preamble transmission. If there is no uplink transmission resource allocated and if an SR is transmitted to the UE having no PUCCH transmission resource allocated for SR transmission, the random access process is triggered in the UE. The command instructing to perform the random access process (hereinafter, referred to as a PDCCH order) is received, the UE starts the random access process. At this time, the UE transmits the preamble based on the control information included in the command (information on the serving cell and transmission timing, and preamble type for the preamble transmission).

Next, the UE determines whether the cell to which the preamble is transmitted is a primary cell or a secondary cell at step 610. If the preamble is to be transmitted to the primary cell, the UE performs preamble transmission and other uplink transmission with the priority rule 1 at step 615. Otherwise if the preamble is to be transmitted to the secondary cell, the UE performs preamble transmission and other uplink transmission with the priority rule 2 at step 620. If a secondary TAG is not configured yet at the timing for preamble transmission, the UE performs the preamble and other uplink transmissions according to the priority rule 1. Otherwise, if one or more secondary TAGs are configured at the timing for preamble transmission, the UE performs the preamble and other uplink transmissions according to the priority rule 2.

A description is made of the priority rules hereinafter. One of the following rules can be selected to be used as the priority rule 1 or the priority rule 2.

[Exemplary Priority Rule]

If the reason of the random access is the receipt of a PDCCH order, the preamble transmission is assigned higher priority.

If the reason of the random access is a BSR transmission (or resume of uplink transmission) and if another uplink transmission is a PUCCH transmission, the other uplink transmission is assigned higher priority.

If the reason of the random access is the BSR transmission (or resume of uplink transmission) and if the other uplink transmission is the PUSCH transmission, the preamble transmission is assigned higher priority.

The priority rule can be defined based on the weight of the other uplink transmission scheduled at the same timing instead of the reason of the random access.

[Another Exemplary Priority Rule]

If the preamble and PUCCH transmissions concur and if PUCCH transmission is a Hybrid Automatic Repeat Request (HARQ) ACKnowledgement (ACK)/Negative ACKnowledgement (NACK) or a Channel Quality Indicator (CQI) transmission, the PUCCH transmission is assigned higher priority.

If the preamble and PUCCH transmissions concur and if the PUCCH transmission is a Sounding Reference Signal (SRS) or a Scheduling Request (SR) transmission, the preamble transmission is assigned higher priority.

If the preamble and PUSCH transmissions concur, the preamble transmission is assigned higher priority.

If the above priority rule is used as the priority rule 2, the HARQ ACK/NACK transmission and the CQI transmission have a priority higher than that of the preamble transmission to a secondary cell (or a secondary TAG), and the SRS transmission and the SR transmission have a priority lower than that of the preamble transmission to the secondary cell (or the secondary TAG).

Also, the priority rule can be defined based on whether the transmission is an initial transmission or retransmission.

[Still Another Exemplary Priority Rule]

If the preamble and PUCCH transmissions concur and if the preamble transmission is an initial transmission, the PUCCH transmission is assigned higher priority.

If the preamble and PUCCH transmissions concur and if the preamble transmission is a retransmission, the preamble transmission is assigned higher priority (because if the preamble is not retransmitted or retransmitted at reduced transmission power, this affects the transmission power control of the UE).

If the preamble and PUSCH transmissions concur, the preamble transmission is assigned higher priority regardless of the fact that the preamble transmission is an initial transmission or retransmission.

The detailed result of the priority rule application varies according to whether the UE can perform the preamble transmission and another uplink transmission simultaneously. If the preamble and other uplink transmissions concur in the UE having no capability of performing simultaneous preamble and other uplink transmissions, the UE performs one of the preamble and other uplink transmissions according to the transmission priorities defined by the priority rule. If the preamble and other uplink transmissions concur in the UE having the capability of performing simultaneous preamble and other uplink transmissions, the UE uses the priorities for assignment of transmission power. For example, if the UE undergoes the uplink transmission power shortage, the UE allocates transmission power to the uplink transmission having higher priority first.

Regardless of whether the UE can transmit preamble and other uplink data simultaneously, the UE applies the same priority rule 2. The priority rule 1 which is UE-specific can be defined differently depending on the UE.

The UE supporting a simultaneous transmission of a preamble and another uplink signal can use a separate rule in association with the SRS transmission.

[Priority Rule for SRS Transmission of UE Supporting Simultaneous Transmissions of Preamble and Another Uplink Signal]

If the SRS and preamble transmissions are triggered in the same cell, only the preamble is transmitted.

If the SRS and preamble transmissions are triggered in different cells, both the preamble and SRS are transmitted simultaneously.

The reason why a separate rule is applied is because the transmissions of the SRS and the preamble in the same cell increases complexity and costs of a physical layer device of the UE in that the SRS is transmitted in a last part of a time duration of a subframe, and the UE has to transmit the SRS at uplink transmission power which is very different from the transmission power at which the preamble is transmitted in the same subframe.

When the UE in a connected state is configured with a PUCCH resource for an SR transmission, random access is not used. However, the transmission power control technique such as a stepwise power ramp up is not applied for the SR transmission on the PUCCH such that, if the uplink transmission power of the UE is configured abnormally, the eNB may not receive the SR transmitted. In order to prepare for such a situation, if an uplink transmission resource is not assigned in spite of a preset number of SR retransmissions on the PUCCH, the UE triggers a random access process to restart uplink transmission power control. Based on the fact that the cell having a high probability of wrong uplink transmission power configuration is the cell in which the SR transmission is performed, the UE may perform the random access process in the cell in which the SR transmission has been performed. Accordingly, if the random access is initiated based on the above, the UE performs random access in the cell where the SRS has been performed, i.e., the primary cell, in spite of the existence of multiple cells supporting random access. Although the preamble transmission takes place along with an important uplink transmission such as the PUCCH and the CQI transmission, the preamble transmission is assigned higher priority. This is because the preamble transmission should be protected from interference by another uplink transmission in the primary cell which may be performed with wrong transmission power based on the fact that the preamble transmission is a part of the process for correcting the wrong transmission power of the primary cell to an appropriate level.

Figure 7:
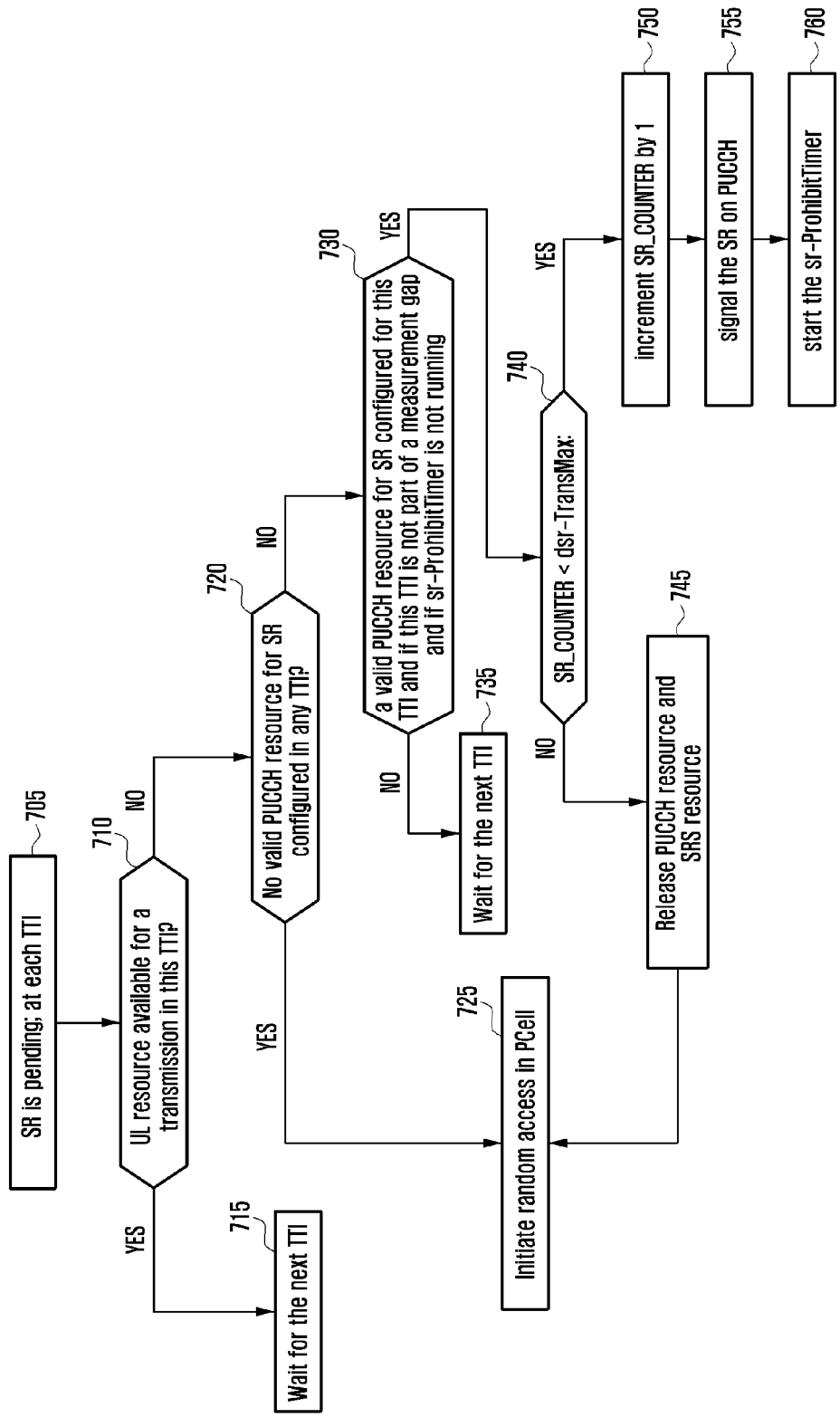
FIG. 7 is a flowchart illustrating a random access method according to an exemplary embodiment of the present invention.

FIG. 7 is a flowchart illustrating a random access method according to an exemplary embodiment of the present invention.

In a state where an SR is triggered or not canceled yet, a UE performs an operation at every TTI at step 705. For reference, the SR is triggered when a regular BSR is triggered and canceled when the BSR reflecting the buffer state until a corresponding time point correctly is included in a MAC PDU.

The UE determines whether there is an uplink transmission resource available in the current TTI at step 710. If it is determined that there is an available uplink transmission resource, the UE waits for the next TTI at step 715. The SR can be canceled due to the regular BSR transmission on the available uplink transmission resource.

If there is no available uplink transmission resource at step 710, the UE determines whether there is a PUCCH resource configured for the SR transmission in any TTI at step 720. If there is no PUCCH resource configured for the SR transmission, the UE initiates random access in a primary cell and cancels the SR at step 725. Otherwise if there is a PUCCH resource configured for the SR transmission, the UE determines whether the PUCCH resource for the SR transmission in the current TTI is available, if the current TTI is not part of a measurement gap and if sr-ProhibitTimer is not running at step 730. If these three conditions are fulfilled, the procedure goes to step 740. Otherwise, if any of the conditions is not fulfilled, the procedure goes to step 735 to wait for the next TTI. The measurement gap is the time duration which the eNB allocates to the UE such that the UE can measure the channel state of the frequency different from a serving cell frequency, the downlink/uplink transmission being prohibited for during the measurement gap. The sr-ProhibitTimer is the timer set to prevent the UE from significant power consumption caused by unnecessarily frequent transmission of the SR.

The UE compares an SR_COUNTER with a dsr-TransMax at step 740. The SR_COUNTER is a variable storing the number of SR transmission times, and the dsr-TransMax is a parameter set by the eNB. If the SR_COUNTER is less than the dsr-TransMax, the procedure goes to step 750 and, otherwise, the procedure goes to step 745.

If the procedure goes to step 745, this means that the number of SR transmissions on a PUCCH has reached a preset maximum value and thus the UE releases a PUCCH transmission resource and an SRS transmission resource. This prevents the PUCCH or an SRS from being transmitted at long transmission power. Next, the UE initiates random access in the primary cell and cancels the SR at step 725. If the procedure goes from step 745 to step 725, the UE allocates higher priority to the preamble transmission in spite of the concurrence of the preamble transmission and a PUSCH transmission (e.g., HARQ ACK/NACK). If the procedure goes from step 720 to step 725, the UE applies a priority rule 1 to determine priorities of the preamble and other uplink transmissions.

If the SR_COUNTER is less than the dsr-TransMax at step 740, the UE increments the SR_COUNTER by 1 at step 750, transmits the SR on the PUCCH resource at step 755, starts the sr-ProhibitTimer at step 760, and waits for the next TTI.

FIG. 8 is a block diagram illustrating a configuration of a UE according to an exemplary embodiment of the present invention.

Referring to FIG. 8, the UE according to an exemplary embodiment of the present invention includes a transceiver 805, a controller 810, a multiplexer/demultiplexer 815, a control message processor 830, and higher layer devices 820 and 825.

The transceiver 805 receives data and control signals on the downlink carriers, and transmits data and control signals on the uplink carriers. In a case where a plurality of cells are configured, the transceiver 805 can transmit/receive the data and control signals through multiple cells.

The multiplexer/demultiplexer 810 multiplexes the data from the higher layer devices 820 and 825 and/or the control message processor 830, and demultiplexes the data received by the transceiver 805 and transfers the demultiplexed data to the higher layer devices 820 and 825 and/or the control message processor 830.

The control message processor 830 takes an action necessary for processing the control message received from an eNB.

The higher layer devices 820 and 825 can be implemented for the respective services to deliver the data generated by the user service such as a File Transfer Protocol (FTP) and a VoIP to the multiplexer/demultiplexer 815 or process and deliver the data from the multiplexer/demultiplexer 815 to the service applications of the higher layer.

The controller 810 verifies the scheduling command, e.g., uplink grant, received by the transceiver 805 and controls the transceiver 805 and multiplexer/demultiplexer 815 to perform uplink transmission at an appropriate timing on an appropriate transmission resource. The controller 810 also controls a random access process. That is, the controller 810 selects one of priority rules and determines the serving cell in which random access is performed.

As described above, the random access method and apparatus of an exemplary embodiment of the present invention is capable of configuring a UE with one of priority rules for prioritizing random access and other uplink transmissions that are agreed between the UE and the eNB to prevent the UE from performing blind decoding for probable cases, resulting in a reduction of transmission resources waste.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A random access method of a terminal, the method comprising:
   determining whether a Scheduling Request (SR) is pending;
   determining, when the SR is pending, whether an uplink transmission resource is available in a current Transmission Time Interval (TTI);
   determining, when the uplink transmission resource is not available, whether a Physical Uplink Control Channel (PUCCH) resource is configured to transmit the SR;
   initiating, when the PUCCH resource is not configured, a random access process in a primary cell;
   determining, when the PUCCH resource is configured, whether the PUCCH resource is configured to transmit the SR in the current TTI, whether the current TTI is not a part of a measurement gap and whether a timer is not running;
   comparing, when the PUCCH resource is configured to transmit the SR in the current TTI and the current TTI is not a part of measurement gap and a timer not running, an SR transmission times counter with a threshold value of SR transmission; and
   initiating, when the SR transmission times counter is equal to or greater than the threshold value of SR transmission, the random access process in the primary cell.

2. The method of claim 1, further comprising:
   releasing, when the SR transmission times counter is equal to or greater than the threshold value of SR transmission, a PUCCH and SRS.

3. The method of claim 1, further comprising signaling, when the SR transmission times counter is less than the threshold value of SR transmission, the SR through the PUCCH.

4. The method of claim 3, further comprising:
   incrementing, when the SR transmission times counter is less than the threshold value of SR transmission, the SR transmission times counter by 1; and
   starting, when the SR transmission times counter is less than the threshold value of SR transmission, the timer.

5. The method of claim 1, wherein the determining of whether the SR is pending comprises determining the SR triggered but not cancelled is the SR pending.

6. The method of claim 5, further comprising:
   triggering, when a Buffer Status Report (BSR) is triggered, the SR; and
   canceling, when the BSR is included in a Media Access Control Packet Data Unit (MAC PDU), the SR.

7. A terminal for performing random access, the terminal comprising:
   a controller configured to determine whether a Scheduling Request (SR) is pending, determine, when the SR is pending, whether an uplink transmission resource is available in a current Transmission Time Interval (TTI), determine, when the uplink transmission resource is not available, whether a Physical Uplink Control Channel (PUCCH) resource is configured to transmit the SR, and initiate, when the PUCCH resource is not configured, a random access process in a primary cell,
   wherein the controller determines, when the PUCCH resource is configured, whether the PUCCH resource is configured to transmit the SR in the current TTI and whether the current TTI is not a part of a measurement gap and whether a timer is not running, compares, when the PUCCH resource is configured to transmit the SR in the current TTI and the current TTI is not a part of the measurement gap and the timer is not running, an SR transmission times counter with a threshold value of SR transmission, and initiates, when the SR transmission, times counter is equal to or greater than the threshold value of SR transmission, the random access process in the primary cell.

8. The terminal of claim 7, wherein the controller releases, when the SR transmission times counter is equal to or greater than the threshold value of SR transmission, a PUCCH and SRS.

9. The terminal of claim 7, further comprising a transceiver configured to signal, when the SR transmission times counter is less than the threshold value of SR transmission, the SR through the PUCCH.

10. The terminal of claim 9, wherein when the SR transmission times counter is less than the threshold value of SR transmission, the controller increments the SR transmission times counter by 1 and starts the timer.

11. The terminal of claim 7, wherein the determining of whether the SR is pending comprises determining that the SR triggered but not cancelled is the SR pending.

12. The terminal of claim 11, wherein the controller triggers, when a Buffer Status Report (BSR) is triggered, the SR and cancels, when the BSR is included in a Media Access Control Packet Data Unit (MAC PDU), the SR.

* * * * *